US008229984B2

(12) United States Patent
Khader et al.

(10) Patent No.: US 8,229,984 B2
(45) Date of Patent: Jul. 24, 2012

(54) METHOD FOR APPLICATION AUTHORING EMPLOYING A PRE-CERTIFIED MULTI-PLATFORM MASTER APPLICATION TEMPLATE

(75) Inventors: Aslam Khader, Beaverton, OR (US); Jeffrey Todd Harper, Tualatin, OR (US); Halstead Winship York, Portland, OR (US)

(73) Assignee: Ensequence, Inc., Portland, OR (US)

( * ) Notice: Subject to any disclaimer, the term of this patent is extended or adjusted under 35 U.S.C. 154(b) by 0 days.

(21) Appl. No.: 12/776,326

(22) Filed: May 7, 2010

(65) Prior Publication Data

US 2011/0023016 A1   Jan. 27, 2011

Related U.S. Application Data

(63) Continuation-in-part of application No. 12/509,363, filed on Jul. 24, 2009.

(51) Int. Cl.
*G06F 17/30* (2006.01)
*G06F 17/00* (2006.01)

(52) U.S. Cl. ......... 707/899; 725/61; 725/110; 725/112; 725/42; 726/23; 370/494; 370/495; 713/176; 713/189

(58) Field of Classification Search .................. 707/899; 725/61, 110, 112, 42; 370/494, 495; 713/176, 713/189; 726/23
See application file for complete search history.

(56) References Cited

U.S. PATENT DOCUMENTS

| 5,335,320 | A | 8/1994 | Iwata et al. |
|---|---|---|---|
| 5,675,752 | A | 10/1997 | Scott et al. |
| 5,978,579 | A | 11/1999 | Buxton et al. |
| 6,237,136 | B1 | 5/2001 | Sadahiro |
| 6,590,589 | B1 | 7/2003 | Sluiman et al. |
| 6,966,002 | B1 * | 11/2005 | Torrubia-Saez ............... 726/29 |
| 6,996,843 | B1 * | 2/2006 | Moran ............................ 726/23 |
| 7,000,185 | B1 | 2/2006 | Murren et al. |

(Continued)

FOREIGN PATENT DOCUMENTS

WO    02/071212 A1    9/2002

OTHER PUBLICATIONS

Carmelo Ardito, Maria Francesca Costabile, Rosa Lanzilotti "Enhancing User Experience while Gaming in Archaeological Parks with Cellular Phones". IDS 2009, Jun. 3-5, 2009, Como, Italy.*

*Primary Examiner* — Yicun Wu
(74) *Attorney, Agent, or Firm* — Marger Johnson & McCollom, P.C.

(57) ABSTRACT

A computer system is used to create an application. A multi-platform application intended for two or more target platforms is created using an authoring environment. The application is converted into a multi-platform master application template by creating an application representation and creating associated metadata that define at least one allowable modification that may be made to the application representation. For each target platform, an application is created from the multi-platform master application template suitable for the target platform, and the application and multi-platform master application template are submitted to a certification body for certification on the target platform. The certification process affirms that the application, with any modification to the application specified by the multi-platform master application template metadata, meets all requirements for certification. The certified multi-platform master application template is used to create a certified application for each target platform.

15 Claims, 4 Drawing Sheets

U.S. PATENT DOCUMENTS

| | | |
|---|---|---|
| 7,165,076 B2 * | 1/2007 | Bentley .................................. 1/1 |
| 7,237,227 B2 | 6/2007 | Lei et al. |
| 7,287,229 B2 | 10/2007 | Forkner et al. |
| 7,360,097 B2 * | 4/2008 | Rothstein ....................... 713/189 |
| 7,412,687 B2 | 8/2008 | Goodwin et al. |
| 7,496,757 B2 * | 2/2009 | Abbott et al. .................. 713/176 |
| 2007/0107016 A1 * | 5/2007 | Angel et al. .................... 725/61 |
| 2009/0049430 A1 | 2/2009 | Pai et al. |
| 2009/0094632 A1 | 4/2009 | Newnam et al. |

\* cited by examiner

FIG. 1

TEMPLATE METADATA

```
201   <?xml version="1.0" encoding="utf-8"?>
202   <template>
203     <modify-property file="page1.tvb" object="text1" property="label" type="string">
204       <constraint text-max-length="28"/>
205     </modify-property>
206     <modify-variable file="page1.tvb" variable="myVar" type="integer">
207       <constraint range-min="0" range-max="10"/>
208     </modify-variable>
209     <modify-property file="page1.tvb" object="text1" property="hAlign" type="string">
210       <constraint valid-value="left"/>
211       <constraint valid-value="middle"/>
212       <constraint valid-value="right"/>
213     </modify-property>
214     <modify-resource file="myApp.tvr" resource="imageRes1">
215       <constraint valid-extension=".png"/>
216       <constraint valid-extension=".bmp"/>
217     </modify-resource>
218     <modify-cell file="data1.tvd" table="tbl1" row="2" col="3" type="integer">
219       <constraint range-min="0"/>
220     </modify-cell>
221   </template>
```

METHOD FOR APPLICATION AUTHORING EMPLOYING A PRE-CERTIFIED MULTI-PLATFORM MASTER APPLICATION TEMPLATE

CROSS-REFERENCE TO RELATED APPLICATIONS

This application is a continuation-in-part of U.S. patent application Ser. No. 12/509,363, filed Jul. 24, 2009, entitled "METHOD FOR APPLICATION AUTHORING EMPLOYING A PRE-CERTIFIED MASTER APPLICATION TEMPLATE", which is incorporated herein by reference.

FIELD OF THE INVENTION

This invention relates generally to generation of digital information attesting to the legitimacy of a transmission, and more specifically to the certification of applications intended for broadcast to and execution upon digital receiver devices.

BACKGROUND OF THE INVENTION

The digital revolution has come to television. With the advent of digitally-encoded television, simple analog television (TV) receivers have been superseded by digital receivers capable of receiving and demodulating electrical signals, then extracting and decoding the compressed video and audio data streams mandated by the Motion Picture Experts Group (MPEG) encoding standards that form the basis for the Advanced Television Systems Committee digital television broadcast standard in the United States. These integrated receiver/decoder (IRD) devices contain analog and digital processing circuitry that is controlled by a central processing unit (CPU). IRDs also contain static and dynamic memory stores, interfaces, and a full complement of features that serve to enable a broad range of computational processing, including the execution of resident or downloaded applications software. When executing such applications, the IRD can generate graphics content that is overlaid onto the video content for display on an external television screen. Newer televisions incorporate the functions of the IRD, making them useful computation platforms capable of executing downloaded applications. More sophisticated IRDs may incorporate disc drive storage subsystems. These personal video recorders (PVRs) are capable of storing and playing back audio/video content.

A parallel body of work has aimed at developing standardized software execution environments that can enable the widespread deployment of interactive applications within the television broadcast infrastructure. This work has been complicated in the past by the wide variety of hardware and software deployed in IRDs, particularly set-top boxes (STBs) developed for the decoding and presentation of signals in cable TV distribution systems. The effort to develop a common Multimedia Home Platform (MHP) for consumer electronic devices led to the development of a Java-based standard for interactivity in the cable television realm, the Open Cable Application Platform (OCAP) now called tru2way. More recently, a separate standardization effort has produced the Enhanced Television Binary Interchange Format (ETV-BIF) standard for less-capable cable platforms.

Because of limitations in memory size and processor power, the operating systems deployed in many IRDs afford few of the security features that are common in more powerful networked computer systems. Therefore, the potential exists for any application that executes on an IRD to negatively impact the operation of the IRD, for example by overwriting system memory or modifying hardware registers. Accordingly, security efforts in the television broadcast environment have focused on validating the security of individual applications that are supplied to IRDs. Network operators commonly require certification of every application that is broadcast on their network, to minimize the chances that an application will cause an IRD on the network to malfunction, which might necessitate a costly technical service call to remedy the problem.

Because of the magnitude of these security concerns, the application certification process is often lengthy and costly to undertake. The process is significantly complicated by the range of hardware and software employed in the various IRDs that might be deployed in a single network, which requires substantial expertise during the execution and testing process. The certification hurdle raises the cost for preparing an application for broadcast, and limits the number of applications that receive certification and enter the broadcast stream.

The certification hurdle is a direct impediment to widespread use of interactivity in television broadcasting, particularly for interactive advertising. For interactive advertising to make economic sense in broad deployment, the money and time investments in getting an application to air must be as small as possible. Interactivity cannot be limited to those few high-profile, high-budget advertisements prepared for showcase events like the Super Bowl or the Olympics, but must be made affordable in the context of 30-second advertisements played with more typical programming content.

To extend the potential audience for an interactive television application, a developer may desire that the interactive television application be deployed to satellite, cable and IPTV distribution networks. Commonly in this case, a separate version of the interactive television application is developed for each target platform, where the separate versions of the application may be based on a common design architecture and behavioral model, but are realized using source code in disparate languages processed through disparate compilers to generate incompatible executable representations. In such cases, each distinct version of the application must undergo certification on the corresponding target platform through a distinct certification procedure, adding to the cost and duration of the certification process for the multi-platform deployment.

Methods are known in the prior art for authoring an application in one environment or in one paradigm and converting or compiling the application for execution on multiple different target platforms, even though the platforms may not support a common source code language or execution environment. For example, Lindsey describes in U.S. Pat. Nos. 5,875,331 and 6,877,155 a system and method for authoring an application as an objected oriented model that retains the function and interrelationships defined for the application, then using multiple object oriented converters to generate source code for the application in multiple desired target languages. Similarly, Bender describes in U.S. Patent Application 20050155016 a method and apparatus that encapsulates a variety of different code generation technologies within a common interface, allowing a single application model to generate executable applications for a variety of runtime environments. Such methods from the prior art may be used to create a multi-platform application template that is suitable for generating source code for each of multiple execution platforms, even though the source code or compiled executable application for any two of the multiple platforms may be incompatible. While such systems and methods may simplify the process of authoring an application destined for multiple platforms, they do not eliminate the necessity for platform-specific certification.

What is required is an application development paradigm that enables a process for creating interactive television applications that can be distributed to multiple distinct execution environments and that can receive certification for broadcast with minimal time and cost.

SUMMARY OF THE INVENTION

The inventive method provides a method for creating a certified application by authoring an application suitable for multiple target platforms; converting the application into a multi-platform master application template suitable for supporting the target platforms; certifying the multi-platform master application template for all target platforms; making a copy of the multi-platform master application template; modifying the copy of the multi-platform master application template; and generating a certified executable application for each of the target platforms from the modified copy of the application template.

The present invention further provides a method for creating a certified application by authoring an application; converting the application into a multi-platform master application template suitable for supporting multiple target platforms by creating at least one metadata item associated with the multi-platform master application template that specifies at least one attribute suitable for modification and specifies at least one requirement for the modification of the attribute; certifying the multi-platform master application template by determining that modifying the attribute in accordance with the requirement for the modification of the attribute does not violate a requirement for certification on any target platform; making a copy of the multi-platform master application template including the at least one attribute; modifying the copy of the multi-platform master application template by modifying the attribute according to constraints specified in the requirement; and generating a certified executable application for each target platform from the modified copy of the application template.

In a further embodiment of the inventive method, converting an application into a multi-platform master application template is accomplished by creating a representation of the application; selecting at least one attribute of the application representation that is suitable for modification; creating at least one metadata item that specifies the selected attribute and specifies at least one requirement for modification of the selected attribute; aggregating the metadata items; associating the aggregated metadata with the application representation; and storing the metadata with the application representation.

In a still further embodiment of the inventive method, certifying a multi-platform master application template for a target platform is accomplished by generating an executable application for the target platform from the application representation; determining that the executable application meets all requirements for certification on the target platform; and determining that modifying each of the attributes specified in the metadata in accordance with all requirements for the modification of the attribute does not violate any requirement for certification on the target platform.

In a still further embodiment of the inventive method, determining that modifying each of the attributes specified in the metadata in accordance with all requirements for the modification of the attribute does not violate a requirement for certification is performed by examination of the application representation and metadata.

In a still further embodiment of the inventive method, certifying a multi-platform master application template for a target platform is accomplished by generating an executable application for the target platform from the application representation, determining that the executable application meets a subset of the requirements for certification on the target platform, and determining that modifying each of the attributes specified in the metadata in accordance with all requirements for the modification of the attribute does not violate any of the subset of requirements for certification on the target platform.

In a still further embodiment of the inventive method, an application representation comprises at least one source code file.

In a still further embodiment of the inventive method, an application representation comprises an in-memory representation of the application.

In a still further embodiment of the inventive method, an application representation comprises an object representation of the application stored in a database.

In a still further embodiment of the inventive method, an attribute to be modified is one of the position, size, shape, or color of a region of color displayed by the application, one of the position, background color, font face, font size, font weight, text color, alignment, or textual content of an area of text displayed by the application, or one of the position, size, or image content of an image displayed by the application.

In a still further embodiment of the inventive method, a requirement for a modification is that the modified value is one of a list of valid values.

In a still further embodiment of the inventive method, a requirement for a modification is that the modified value falls within a bounded or half-bounded range of values.

In a still further embodiment of the inventive method, a requirement for a modification is that the modified value matches a regular expression.

In a still further embodiment of the inventive method, the metadata are stored in a form distinct from the application representation.

In a still further embodiment of the inventive method, the metadata are stored in an Extensible Markup Language format.

In a still further embodiment of the inventive method, certifying a multi-platform master application template for a target platform further includes the step of determining that modifying all of the attributes in accordance with all of the requirements for modification of an attribute does not violate any requirement for certification on the platform.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a method for authoring a certified application.

As used herein, the term "application" is intended to refer generally to an experience of appearance and behavior engendered by a computing platform. An application is commonly authored in a source code language using an authoring environment, the source code being used to generate an executable version of the application for deployment to a computing platform to realize the desired experience.

As used herein, the term "executable application" is intended to refer to a body of digital information comprising executable instructions and data that when processed on a suitable computing platform yields appearance and behavior as intended by the creator of the application. An executable application may be encoded using native CPU instructions, interpreted byte codes, declarative data structures, or any combination of such encodings. An executable application may respond to external events by appropriate modification of appearance and behavior, as specified by the code and data comprising the executable application.

As used herein, the term "target platform" is intended to refer to a combination of hardware and software upon which an executable application executes. Two target platforms may differ with respect to the form in which an executable application is encoded; with respect to the content of the encoded form of an executable application; or with respect to the form, appearance, invocation or function of platform features accessible to or utilizable by an executable application.

As used herein, the term "application representation" is intended to refer to a body of digital information that defines an application. The application representation may be one or more source code files, an in-memory representation of the application structure and function, or a database representation of the application structure and function. An application representation may be used to generate an executable version of the application. An application representation suitable for two or more different target platforms may be used to generate an executable version of the application suitable for each of the two or more different target platforms. The methodology by which an application representation is used to generate multiple executable versions may be by any of several techniques known in the prior art.

As used herein, the term "metadata" is intended to refer to human-readable or binary content which is not part of an application representation, but which refers to attributes of the application representation, or to modifications that may be made to such attributes.

As used herein, the term "template" is intended to refer to an application representation and associated metadata. The associated metadata define allowable modifications to the application representation. The application representation for a template can be modified in accordance with metadata associated with the application representation. The modified application representation may be used to generate an executable application. The phrases "application template" and "master application template" as used herein are synonymous with the term "template".

As used herein, the term "multi-platform" is intended to refer to a set of two or more platforms that differ such that a single executable application does not execute on all of the two or more platforms. Equivalently, the term "multi-platform" is intended to refer to a set of two or more platforms that differ such that the realization of a unified application appearance and behavior on the set of platforms necessarily requires a unique executable application for each of the two or more platforms in the set. A "multi-platform template" is herein said to be "designated" to each platform comprising the set of two or more platforms for which the template may be used to create an executable application.

As used herein, the terms "certify" and "certification" are intended to refer to the process of validating the appearance and/or behavior of an executable application against a specified set of requirements, to determine that the application meets each and all of the specified requirements.

As used herein, the phrase "generate an application" is intended to refer to the process of converting an application representation into an executable application.

As used herein, the term "resource" is intended to refer to a body of binary data, exclusive of the source code or executable instructions of an application, which is used during the execution of the application to control the appearance or behavior of the application.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the scope or spirit of the claimed subject matter.

Figure 1:
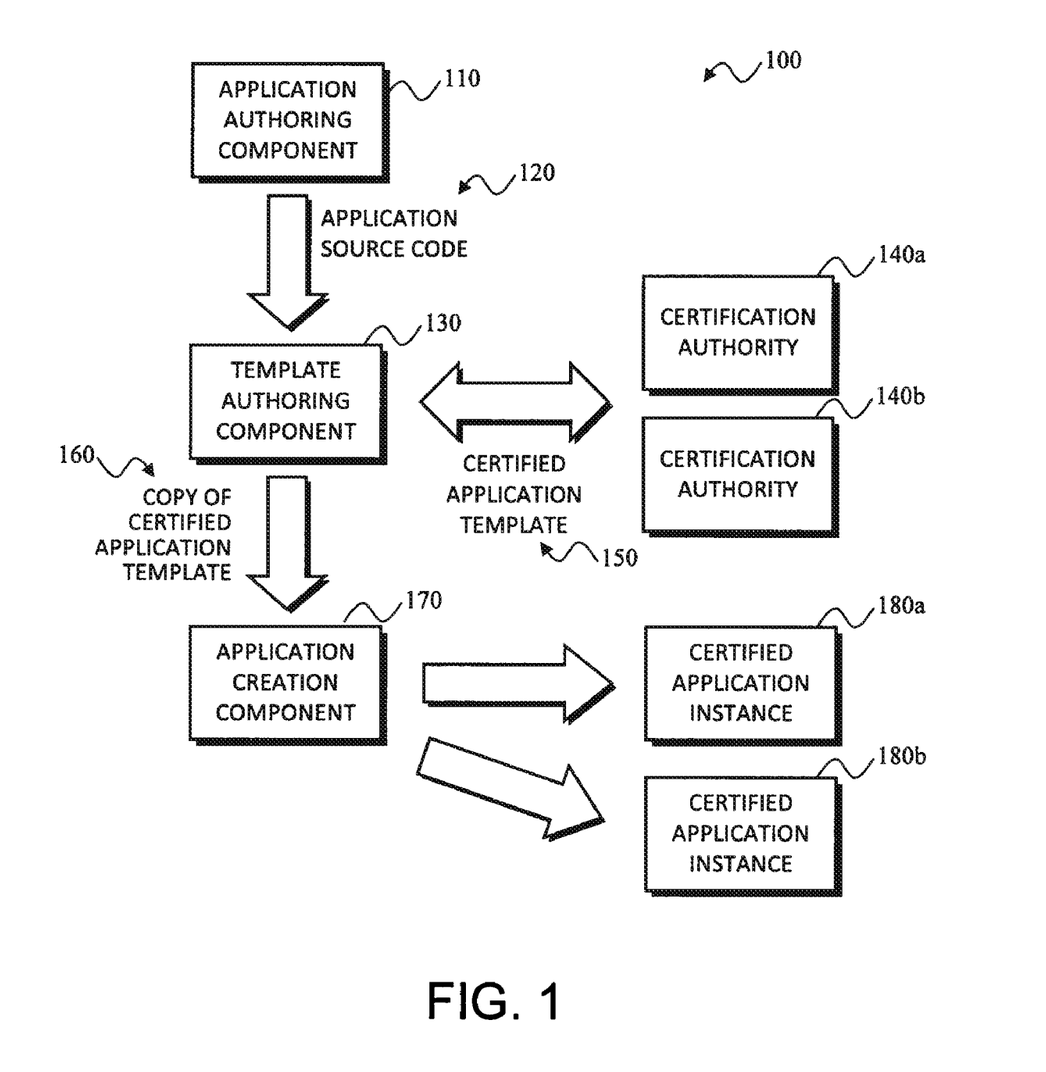
FIG. 1 depicts the components of an exemplary system that implements the inventive method.

FIG. 1 depicts the components of an exemplary system 100 on which the inventive method may be practiced. An application can be authored using an application authoring component 110. An example of a suitable application authoring component 110 is the Create™ ETV-BIF product developed by Ensequence, Inc. of Portland, Oreg. A further example of an application authoring component 110 is the TVWorks™ XML Development Kit developed by TVWorks, LLC, of Mill Valley, Calif. In this exemplary system, the application representation is in the form of source code.

Once application source code 120 has been written, the application source code is converted into a multi-platform master application template and multi-platform master application template metadata are authored using a template authoring component 130. Template authoring component 130 serves to create and modify metadata associated with the multi-platform master application template. Template authoring component 130 may be any suitable text editor executing on a computer workstation, or may be a specialized editing environment configured to create and edit template metadata, for example by means of an application executing on a computer workstation or through a web services interface specialized for this purpose. A multi-platform master application template created by template authoring component 130 is in a form suitable for the generation of application representations executable on the two or more target platform for which the template is designated.

Following the authoring of the multi-platform master application template, the multi-platform master application template is submitted to two or more certification authorities 140a, 140b for certification testing. The multi-platform master application template is submitted for certification testing on each target platform for which the template is designated. In an exemplary embodiment of the inventive method, the submission to the two or more certification authorities 140a, 140b comprises the multi-platform master application template content and an application generated from the multi-platform master application template that is suitable for execution on the target platform appropriate to the certification authority, for example by use of the default values of any modifiable attributes of the template. Examples of how the multi-platform master application template content may be submitted to the certification authorities 140a, 140b include: (a) in the form of human-readable source code and metadata files, (b) through a specialized application that visualizes an in-memory representation of the application representation and associated metadata, (c) through access to a database storing the application representation and associated metadata, or (d) by some other means that allows examination of the application representation and the allowable modifications of the representation. Certification authority 140a, 140b may certify the application, or may report problems with the certification testing. In the latter case, further modification of a multi-platform master application template is performed using template authoring component 130.

Once all certification authorities 140a, 140b certify a multi-platform master application template as a certified multi-platform master application template 150, the certified multi-platform master application template can be used to create certified applications. When creating a certified application, a copy 160 of a certified multi-platform master application template is created, and an application authoring component 170 is used to modify the source code of the copy of the certified multi-platform master application template within the constraints embodied in the multi-platform master application template metadata. Application authoring component 170 may be any suitable text editor executing on a computer workstation, or may be a specialized editing environment configured to allow modification of the application template application representation in accordance with the requirements for modification embodied in the metadata of the application template, for example by means of an application executing on a computer workstation or through a web services interface specialized for this purpose. Importantly, any modification of the copy of the certified multi-platform master application template applies to each executable application instance generated from the modified template copy.

Once all modifications have been performed, application authoring component 170 is used to generate an executable version of the certified application instance for each target platform (e.g. instances 180a, 180b for respective two or more target platforms) for which the multi-platform master application template is designated.

To further clarify, allowable modifications of the application template application representation do not constitute, incorporate or permit lexical, syntactic or semantic modifications that would violate source code requirements of the application creation component, for example the requirements of a C, C++, or C# language compiler. Rather, in the inventive method allowable modifications and requirements thereof are limited to those which would maintain lexical, syntactic and semantic correctness with respect to the source code requirements of the application creation component, but which nonetheless modify the appearance and/or behavior of the resulting application.

Application authoring component 110, template authoring component 130, and application creation component 170 may each be realized on a single system, may each be realized on multiple systems, or may all be realized on a single system. Application creation component 170 may comprise a single multi-platform generation component or may comprise multiple independent application generation sub-components, each realized on a separate system or all realized on a single system.

A multi-platform master application template comprises an application representation and associated metadata that define the characteristics of the template. The metadata may be incorporated into the application representation, or may be stored in a form distinct from the application representation. By way of illustration, the following description describes a set of metadata tags utilized in an exemplary implementation of the inventive method, in which the application representation is source code written using the TVScript-BIF language as employed in the Create ETV-BIF application authoring product.

Briefly, TVScript-BIF is an object-oriented language for authoring declarative applications that execute on an ETV-BIF user agent. A TVScript-BIF application consists of: (a) an object hierarchy constructed from the various native objects defined by the TVScript-BIF language, (b) optional variables that contain static or dynamic values used during the execution of the application to control application appearance or behavior, (c) optional event function code that is executed in response to events, (d) optional data tables used to control application appearance or behavior, (e) optional resources used when executing the application, and (f) and optional signal and trigger data that may be sent to the application during execution. TVScript-BIF applications execute on compliant ETV-BIF user agents. The ETV-BIF binary format and the behavioral requirements for a compliant ETV-BIF user agent are defined by OpenCable specification OC-SP-ETV-BIF1.0-I04-070921 "Enhanced TV Binary Interchange Format 1.0" issued by Cable Television Laboratories Inc., Louisville, Colo., incorporated herein by reference.

The source code of a TVScript-BIF application comprises a series of human-readable files that: (a) define the hierarchy of object instances ("widgets") that make up the application, (b) declare the associated functions and variables used during the execution of the application, (c) specify the values of data tables incorporated into the application, (d) designate the source files for image and font resources used by the application, and (e) define the structure of the ETV-BIF resources to be created when generating the executable application. The source code of a TVScript-BIF application can be used to directly generate one or more ETV-BIF binary resources suitable for execution on an ETV-BIF user agent, or may be transcoded into an equivalent source code representation in Java, C, C#, or other source code languages, or into other equivalent application representations, for compilation to and execution on other target platforms.

In an exemplary implementation of the inventive method, when a TVScript-BIF application is converted into a template, metadata are stored with the source code. The metadata contain the specifications for how the template application source code may be modified when creating a version of the application from the template. In this exemplary implementation, the metadata are encoded as an XML document.

Figure 2:
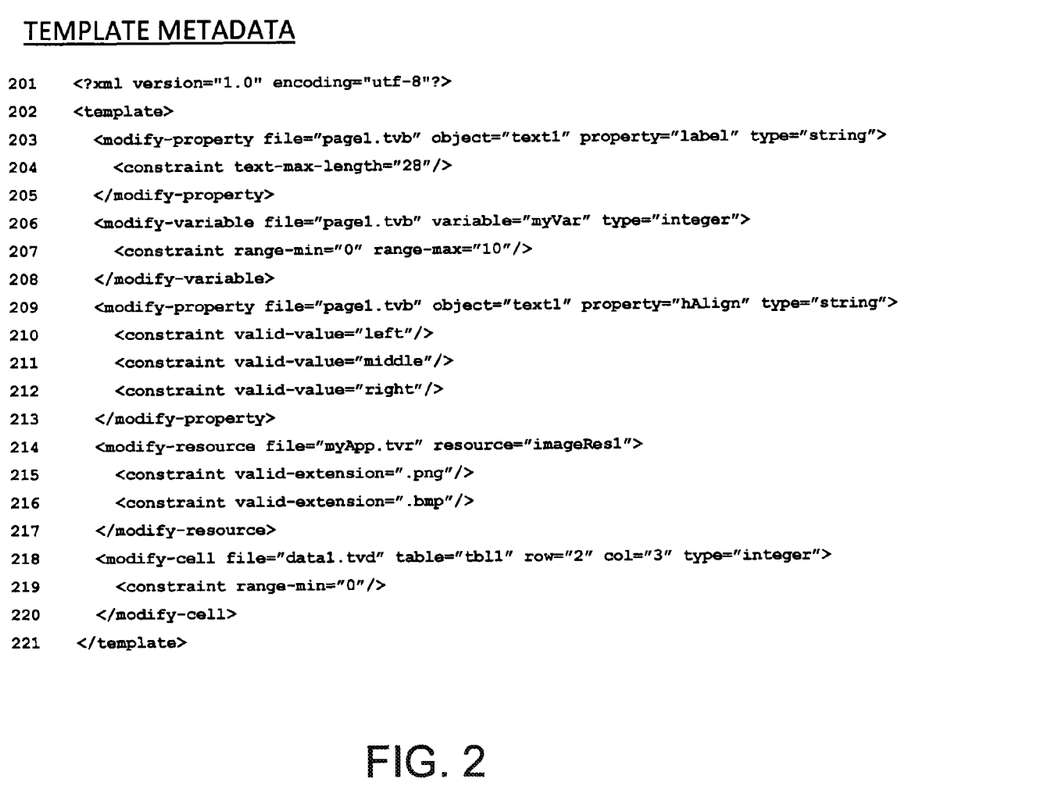
FIG. 2 depicts an example of template metadata.

FIG. 2 shows an example of the content of a metadata file defining the allowable modifications in a TVScript-BIF application. Note that the line numbers in FIG. 2 are not part of the source content of the metadata file but are included as reference markers for the following discussion. Furthermore, the formatting conventions illustrated in FIG. 2 are not a requirement of the inventive system, but are intended to clarify the structure and content of the example file.

In this illustrative example, line 201 signals that the contents of the file are compliant with the Extensible Markup Language specification, and that the content is encoded using the UTF-8 standard.

A 'template' tag at line 202 signals that this file contains a specification for the metadata of a master application template.

A 'modify-property' tag at line 203 denotes a property of an object instance, the initial value of which may be modified. A 'modify-property' tag has: an attribute 'file' that names the source file containing the code for the declaration of the object instance whose property can be modified; an attribute 'object' that identifies the object instance within the source file whose property can be modified; an attribute 'property' that identifies the property within the object instance that can be modified; and an attribute 'type' that signals the type of the content to be provided as the value for the property. Examples of allowable content types are 'integer', 'float', and 'string'. The 'modify-property' tag at line 203 names the 'label' property of the 'text1' object instance contained in source file 'page1.tvb'. If this property is modified during the application creation process, the new content will be substituted for the original value of the named property when the application representation is modified.

The content type determines the allowable textual content that can be specified for the substitution. Example content types 'integer', 'float', and 'string' allow for different constraint models to be applied depending on whether the substitute content for the source file comprises an integer value, a real number value, or a sequence of characters, respectively. For example, the allowable textual content for an 'integer' content type is limited to string values that express an integer value, such as "12", "−365", and "0x7F3E9".

The 'modify-property' tag at line 203 contains a 'constraint' child tag at line 204. A 'constraint' tag defines restrictions on the content of the modification that can be made to the entity named in the parent tag of the 'constraint' tag. The 'constraint' tag at line 204 restricts the maximum number of characters that can be contained in the string provided to substitute for the 'label' property of the 'text1' object instance.

A 'modify-variable' tag at line 206 denotes a variable whose initial value may be modified. A 'modify-variable' tag has attribute 'file' that names the source file containing the code for the declaration of the variable whose initial value can be modified; attribute 'variable' that names the variable that can be modified; and attribute 'type' that signals the type of the content to be supplied as the value for the variable. The 'modify-variable' tag at line 206 names the integer variable 'myVar' declared in source file 'page1.tvb', and specifies a replacement value of type integer.

The 'modify-variable' tag at line 206 contains a 'constraint' tag at line 207. The 'constraint' tag at line 207 contains attributes 'range-min' and 'range-max' that specify a range of valid integer values that can be substituted for the initial value of the 'myVar' variable, in this case the range from 0 to 10 inclusive.

A second 'modify-property' tag appears at line 209, naming the 'hAlign' property of the 'text1' object instance contained in source file 'page1.tvb'. This tag contains three child 'constraint' tags at lines 210, 211, and 212. These 'constraint' tags list valid string values that may be substituted for the initial value of the 'hAlign' property. If a modification tag contains multiple 'constraint' tags, by default the substitution value must satisfy at least one of the constraints.

Other tags (not shown) can be used to modify the logical implications of one or more constraints. For example, a 'not' constraint containment tag can contain a constraint that must not be satisfied for the 'not' constraint to be satisfied. Logical combinations of constraints can be achieved by the use of 'and' and 'or' constraint containment tags that carry the corresponding Boolean logic implications. An 'and' tag can contain one or more 'constraint', 'not', 'and' and 'or' tags, all of which must be satisfied for the 'and' to be satisfied. An 'or' tag can contain one or more 'constraint', 'not', 'and' and 'or' tags, any of which must be satisfied for the 'or' to be satisfied.

A 'modify-resource' tag at line 214 signals a resource whose source property may be modified. In a TVScript-BIF application, resources are referenced through unique identifiers, each identifier being associated with a URI that defines the source file from which the resource is generated. A 'modify-resource' tag has attribute 'file' that names the source file containing the declaration of the resource identifier, and attribute 'resource' that names the resource identifier whose source property is to be modified.

The 'modify-resource' tag at line 214 contains two child 'constraint' tags at lines 215 and 216. These 'constraint' tags contain 'valid-extension' attributes that define allowable file extensions for a URI that is specified as the new source for the resource named in the 'modify-resource' tag.

A 'modify-cell' tag at line 218 denotes a cell within a data table, that is, a given row and column location within the data table, the value of which may be modified. A 'modify-cell' tag has attribute 'file' that names the source file containing the code for the data table, attribute 'table' that names the data table within the source file, attribute 'row' that signals the row within the table containing the cell, attribute 'col' that signals the column within the table containing the cell, and attribute 'type' that signals the type of the content to be supplied as the value for the data table cell.

The 'modify-cell' tag at line 218 contains a 'constraint' tag at line 219 that specifies a range of valid values that can be substituted for the initial value of the cell at row 2, column 3 of data table 'tbl1' in file 'data1.tvd'. The 'constraint' tag at line 219 specifies only a minimum value for the range. This signals that the range of valid values is any value greater than or equal to the minimum value, which in the example is zero.

The specific tags depicted in FIG. 2 are intended to be a representative but not limiting example of the types of modifications and constraints that might be specified in template application metadata. For example, a 'constraint' tag that specified only a 'range-max' attribute would define a range that extended to any value less than or equal to the maximum value. For real values, ranges might be defined inclusive or exclusive of the end points. For string values, a constraint might list a regular expression that the replacement value must match. Other types of allowable modifications and allowable constraints evident to one skilled in the art fall within the spirit and scope of the inventive system.

Figure 3:
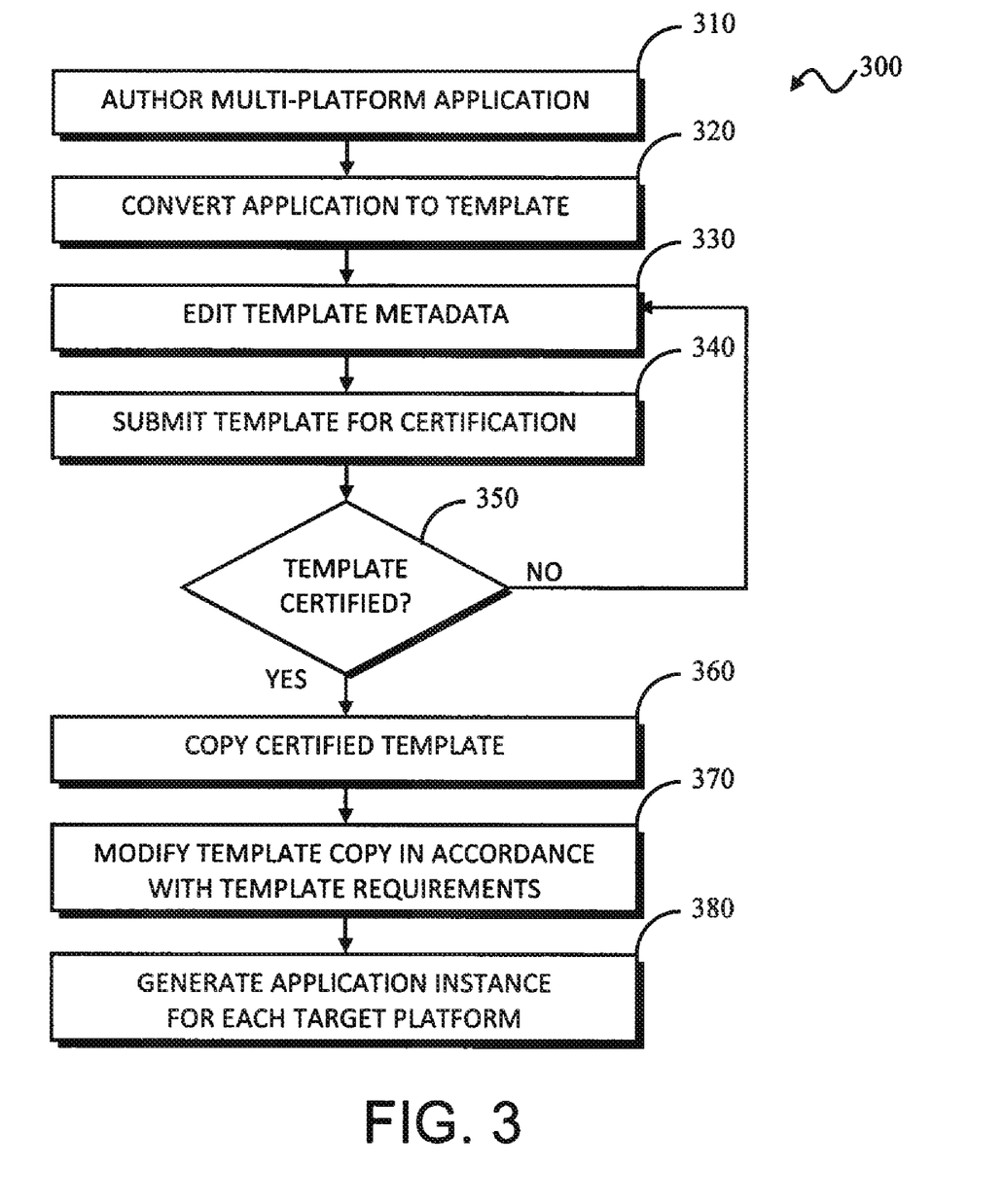
FIG. 3 depicts a flowchart delineating the high-level steps of an exemplary implementation of the inventive method.

The presence of metadata stipulating allowable modifications and associated constraints on those modifications characterizes a multi-platform master application template. Therefore, the process of authoring a template consists of creating the metadata defining the set of modifications and associated constraints that are allowable when modifying the original application representation to create a new application based on the template. Attention is now directed to FIG. 3, which depicts a flowchart of the steps of creating and utilizing a multi-platform master application template in accordance with the inventive method.

FIG. 3 depicts the flowchart 300 of the steps of an exemplary implementation of the inventive method.

At a step 310, a multi-platform application is authored. This step may be undertaken using any multi-platform application authoring environment known in the art, the result being an application representation that defines the application appearance and behavior and is suitable for the generation of executable application instances for two or more different target platforms.

At a further step 320, the application is converted into a multi-platform master application template by the addition of metadata to the application representation. In the exemplary implementation described above with reference to FIG. 2, the application representation comprises one or more source code files in human-readable format, while the metadata is stored in a separate XML document. In an alternative implementation, the application representation may be generated by creating an in-memory representation of the application structure and function, for example in the form of an object or a set of objects that correspond to the objects, properties, functions, and other elements of the executable application. This in-memory representation could be created by parsing source code, or by decompiling the contents of an executable application. In this alternative embodiment, the metadata could be stored in an XML document associated with the original source code or the executable application, or the application representation could be serialized out to one or more disk files and the metadata stored in an XML document associated with the serialized application representation. In yet a further alternative embodiment, the application representation could comprise a series of objects that correspond to the elements of the executable application, and the objects could be stored in a relational database. In this yet further alternative embodiment, the metadata could be stored in the relational database in association with the objects comprising the application representation. Other forms of representation and storage might be employed without departing from the scope and intent of the inventive method.

At a further step 330, the multi-platform master application template metadata are edited. The editing process comprises the creation, modification, rearrangement, and deletion of specifications of allowable modifications to the application representation, as exemplified by the modifications described above in reference to FIG. 2. The editing process further includes the creation, modification, and deletion of constraints on the allowable modifications, as exemplified by the constraints described above in reference to FIG. 2. The editing process may be performed through a text editor, through an application interface specifically encoded to allow such editing, or by other means known in the art.

At a further step 340, the multi-platform master application template is submitted for certification. Certification is required for each of the platforms for which the template is designated. In accordance with the description above in reference to FIG. 1, certification is accomplished by submission to a certification body of an exemplary application generated from the template, along with the metadata comprising the allowable modifications to the application representation. The certification process is described in greater detail below with reference to FIG. 4. The submission and certification steps are repeated for each of the platforms for which the template is designated.

At a further step 350, each certification body to which the template is submitted returns a certification decision. If the multi-platform master application template is not certified for all designated platforms, further editing is performed at a step 330, after which the multi-platform master application template is again submitted for certification at a step 340. If the multi-platform master application template is certified, the certified multi-platform master application template is available for use in creating certified application instances for each target platform for which the template is designated.

At a further step 360, a copy of the certified multi-platform master application template is made, and an application representation formed therefrom, for use in creating new application instances.

At a further step 370, the application representation of the copy of the certified multi-platform master application template is modified in accordance with the metadata contained in the multi-platform master application template. Only those aspects of the application representation specified in the metadata may be modified, and each such modification must be made in accordance with any constraints specified for the modification in the metadata. Importantly, any modification of the copy of the certified multi-platform master application template applies to each executable application instance generated from the modified template copy.

Once all desired modifications have been performed, at a further step 380 the modified application representation is used to generate an executable application instance for each target platform for which the template is designated. By virtue of the inventive method, the resulting executable applications can be denoted as certified without further analysis or testing by the certification body.

The operation performed at step 370 of modifying the application representation in accordance with the metadata contained in the multi-platform master application template may be performed using any suitable editing environment known in the prior art. For example, U.S. Pat. No. 6,590,589 describes one such system that would be adaptable to the performance of source code modification. Similarly, the on-Q Publish™ software product marketed by Ensequence, Inc., provides a suitable editing environment for this purpose.

The steps of flowchart 300 may be performed by a single person or by multiple persons, and may be accomplished on a single system or on multiple systems.

Figure 4:
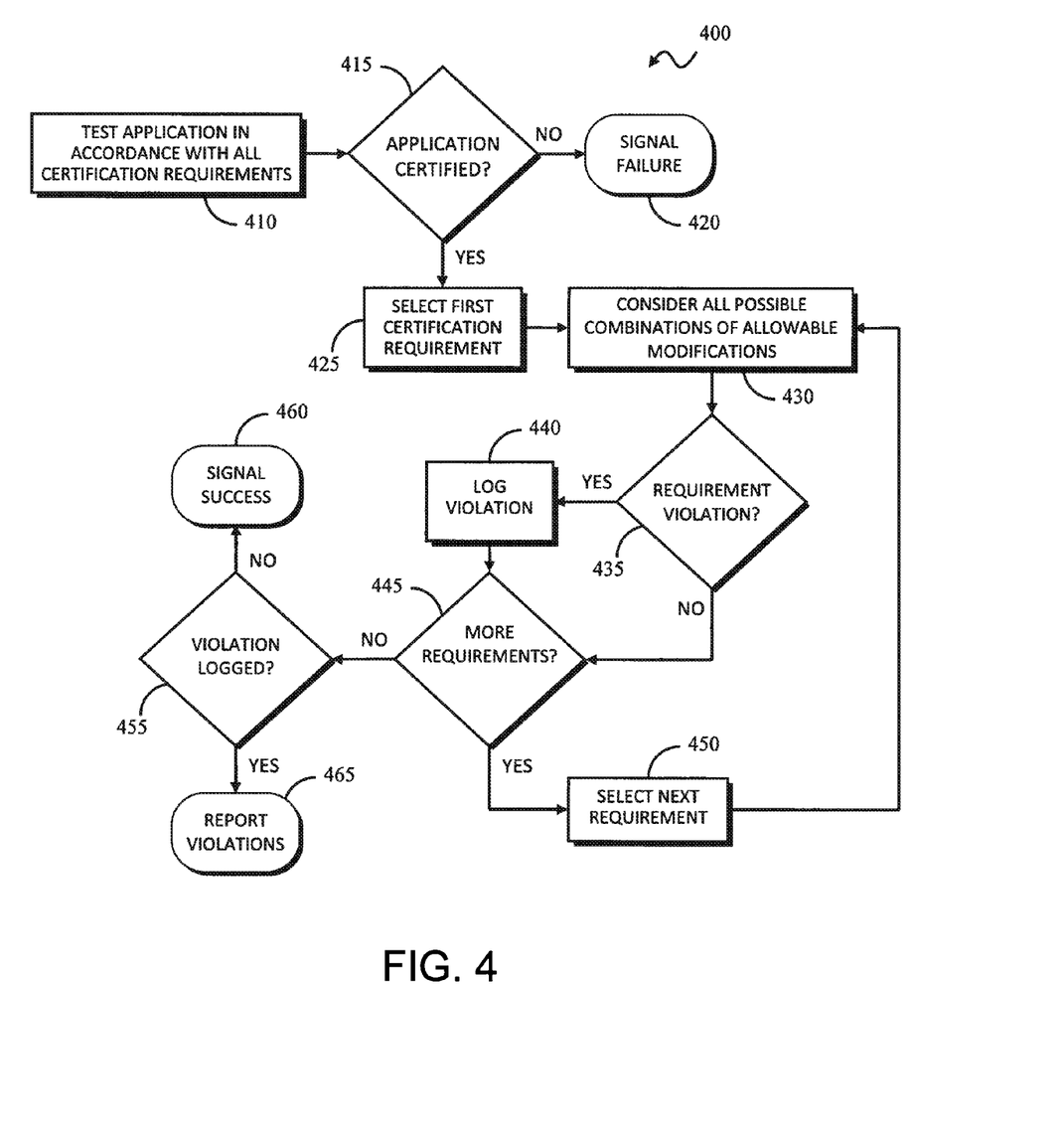
FIG. 4 depicts a flowchart delineating the high-level steps of an exemplary certification procedure.

Attention is now directed to FIG. 4, which depicts a flowchart of an exemplary process for certifying a multi-platform master application template. At a step 410, the application submitted with the multi-platform master application template is certified according to the conventional certification process for an application. At a step 415, the status of the application certification is determined. If the application fails certification, at a step 420 the certification failure is reported and the process terminates. If the application passes certification, at a step 425 the first certification requirement is selected. At a step 430, the appearance and behavior of the application for all allowable values of all allowable modifications are compared against the selected certification requirement. At a step 435, a determination is made if any of the allowable combinations of modifications violates the selected certification requirement. If the certification requirement is violated, at a step 440 the violation is logged. At a step 445, a check is made if at least one more certification requirement remains to be considered. If at least one certification requirement remains to be considered, at a step 450 the next certification requirement is selected, and step 430 is repeated. If no more certification requirements remain to be considered, at a step 455 a test is made if any certification requirement violation was logged. If no violation was logged, at a step 460 certification success is reported and the process terminates. If at least one violation was logged, at a step 465 all logged certification requirement violations are reported and the process terminates.

In an alternative embodiment of the inventive method, the certification body may not be able to fully certify the multi-platform master application template, but rather may certify that the multi-platform master application template and any application derived from the template meet some but not all of the required certification requirements, for example as exemplified by step 465 described above in reference to FIG. 4. In this alternative embodiment, the application instances generated from the modified multi-platform master application template could be submitted to the certification body for final certification, but the certification process performed on the generated application instance would not require all of the testing required for a full certification evaluation, but would be limited to those certification requirements that were logged when the multi-platform master application template was submitted for certification. In this alternative embodiment, the inventive method would advantageously reduce the cost and time required for the final certification process by limiting the required certification testing to a subset of the certification requirements.

The steps of flowchart 400 may be performed by a single person or by multiple persons, and may be accomplished on a single system or on multiple systems.

The term "computer" is used herein to refer to any device with processing capability such that it can execute instructions. Those skilled in the art will realize that such processing capabilities are incorporated into many different devices and therefore the term "computer" includes PCs, servers, mobile telephone, personal digital assistants and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

The steps of the methods described herein may be carried out in any suitable order, or simultaneously where appropriate. Aspects of any of the examples described above may be combined with aspects of any of the other examples described to form further examples without losing the effect sought.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. In a computer system providing an application authoring environment, a method of creating a set of certified applications characterized by:
   authoring an application suitable for at least two different target platforms;
   converting said application into a multi-platform master application template, wherein said converting is characterized by:
      creating a representation of said application;
      selecting at least one attribute of the application representation that is suitable for modification;
      specifying at least one requirement for modification of said selected attribute;
      creating at least one metadata item describing said at least one attribute and said at least one requirement;
      aggregating each of said at least one metadata item;
      associating said aggregated metadata with said application representation; and
      storing said metadata with said application representation;
   certifying said multi-platform master application template for each of said at least two target platforms, wherein said certifying is characterized by:
      generating a first executable application for said target platform from said application representation;
      determining that said first executable application meets all of a set of requirements for certification on said target platform; and
      determining that modifying each of said at least one attribute specified in said metadata in accordance with all requirements for the modification of said attribute does not violate any of the set of requirements for certification on said target platform;
   making a copy of said certified multi-platform master application template;
   modifying said copy of said application template by modifying at least one attribute described in at least one metadata item associated with said application template in accordance with all requirements for the modification of said attribute; and
   generating a certified executable application for each of said at least two target platforms from said modified copy of said application template.

2. The method of claim 1, wherein determining that modifying each of said at least one attribute specified in said metadata in accordance with all of the at least one requirement for the modification of said attribute does not violate any of the requirements for certification is performed by examination of the application representation and metadata.

3. The method of claim 1, wherein said application representation comprises at least one source code file.

4. The method of claim 1, wherein said application representation comprises an in-memory representation of said application.

5. The method of claim 1, wherein said application representation comprises an object representation of said application stored in a database.

6. The method of claim 1, the at least one metadata item associated with the master application template specifying at least one attribute suitable for modification and specifying at least one requirement for modification of the attribute, wherein said attribute to be modified is one of the position, size, shape, or color of a region of color displayed by said application; one of the position, background color, font face, font size, font weight, text color, alignment, or textual content of an area of text displayed by said application; or one of the position, size, or image content of an image displayed by said application.

7. The method of claim 1, the at least one metadata item associated with the master application template specifying at least one attribute suitable for modification and specifying at least one requirement for modification of the attribute, wherein the requirement for a modification is that the modified value is one of a list of valid values.

8. The method of claim 1, the at least one metadata item associated with the master application template specifying at least one attribute suitable for modification and specifying at least one requirement for modification of the attribute, wherein the requirement for a modification is that the modified value falls within a bounded or half-bounded range of values.

9. The method of claim 1, the at least one metadata item associated with the master application template specifying at least one attribute suitable for modification and specifying at least one requirement for modification of the attribute, wherein the requirement for a modification is that the modified value matches a regular expression.

10. The method of claim 1, wherein said metadata are stored in a form distinct from the application representation.

11. The method of claim 10, wherein said metadata are stored in an Extensible Markup Language format.

12. The method of claim 1, wherein certifying said multi-platform master application template for a target platform further includes the step of determining that modifying all of the at least one attribute in accordance with all of the at least one requirement for the modification of said attribute does not violate any requirement for certification.

13. The method of claim 1, wherein certifying said multi-platform master application template for each of said at least two target platforms includes submitting said master application template to two or more certification authorities for certification testing.

14. The method of claim 1, wherein the set of requirements includes all requirements for certification on the platform.

15. The method of claim 14, wherein the set of requirements includes a subset of all of the requirements for certification on the platform.

* * * * *